Aug. 3, 1937.  D. D. PEEBLES ET AL  2,088,606
MANUFACTURE OF STABLE POWDERED PRODUCTS CONTAINING MILK SUGAR
Filed April 24, 1936
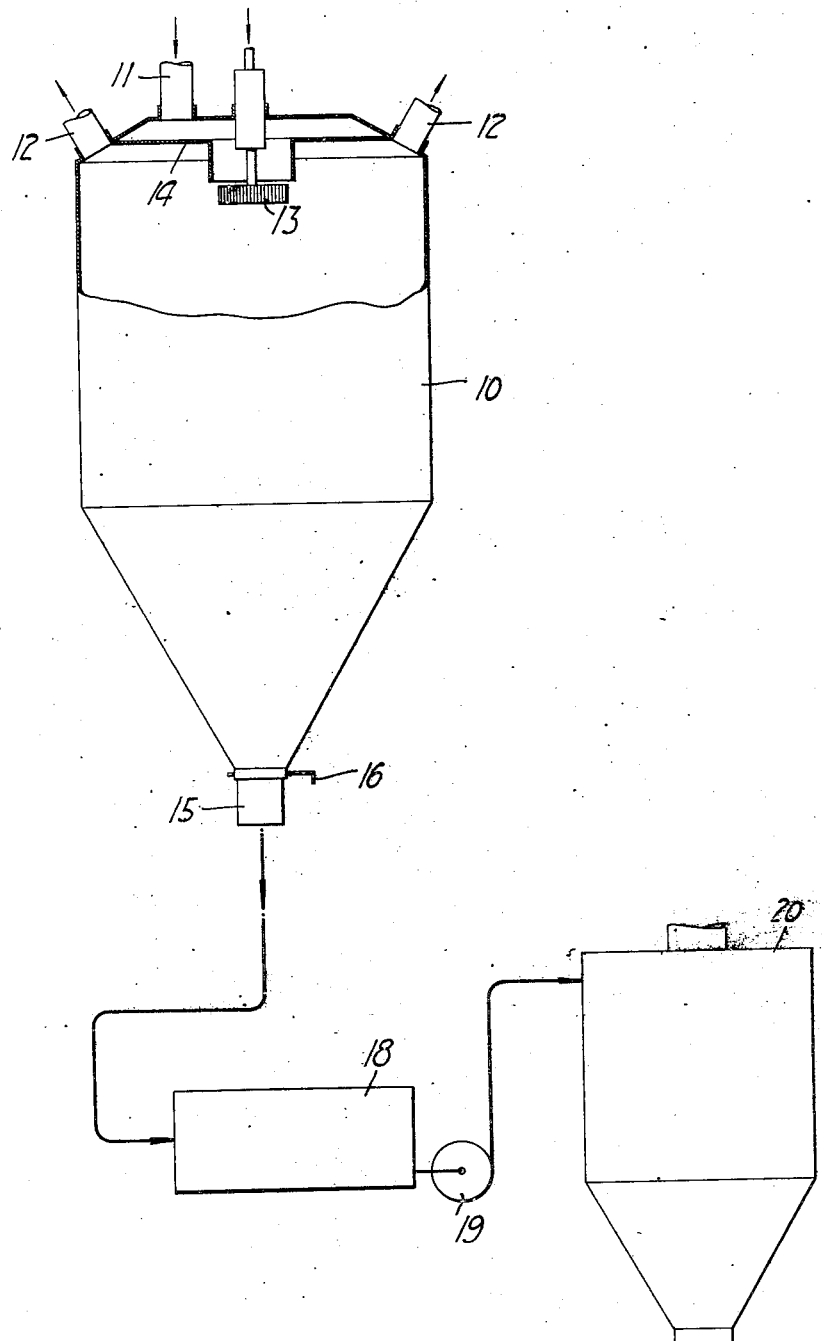
INVENTORS.
David D. Peebles
Paul D. V. Manning
BY
ATTORNEY.

Patented Aug. 3, 1937

2,088,606

UNITED STATES PATENT OFFICE

2,088,606

MANUFACTURE OF STABLE POWDERED PRODUCTS CONTAINING MILK SUGAR

David D. Peebles, Eureka, and Paul D. V. Manning, Berkeley Woods, Calif.

Application April 24, 1936, Serial No. 76,236

9 Claims. (Cl. 99—57)

This invention relates generally to the manufacture of products in stable form from liquid materials containing such quantities of milk sugar or lactose that desiccation thereof to anhydrous powdered form results in a product markedly hygroscopic. As an example of such liquid materials, reference is made to various milk products, particularly ordinary whey resulting from the commercial manufacture of casein or cheese.

It has previously been known that whey and the like materials relatively high in milk sugar or lactose content, can be desiccated to form an anhydrous powder, in spray type desiccators generally utilized for the desiccation of milk. However, the markedly hygroscopic nature of such desiccated products as heretofore produced by spray drying renders them unsuitable for commercial purposes unless stored and shipped in sealed containers, the expense of which is substantially prohibitive. It is highly hygroscopic because the milk sugar content, which constitutes a substantial percentage of the solids of milk whey, is in the anhydrous form. In a stabilized product, such as is produced by the present method, the milk sugar content is in the form of a monohydrate and is relatively stable when exposed to the atmosphere. Various processes have been resorted to to produce such products in stable form.

One method of manufacturing stable products of the above character is to first form an anhydrous powder by spray drying, after which this powder is permitted or caused to absorb water to form a hard cake, and the hard cake then ground. Such a method is relatively costly, due to the apparatus required and the extended time period of treatment. Likewise certain factors involved may cause the formation of an inferior product. Another method consists in permitting a concentrated whey to set for a sufficiently long period of time to permit the lactose to crystallize and the mass to become pasty. The pasty mass is spread on trays and dried in tunnels, after which the resulting solid, brittle material is ground to form the final stabilized product. This latter method likewise requires expensive equipment and a relatively long period of time for completion. In both the methods just outlined, the final product appears to be detrimentally affected, because of the relatively long period of contact between the solids of the whey and the water containing dissolved mineral salts.

In our Patent No. 1,928,135 there is disclosed a process for producing a stabilized granular food product from whey or the like by first spray drying the material to form an anhydrous product in particle or powdered form and then distributing moisture to the particles while suspended in a gaseous medium to convert the milk sugar thereof to the hydrate form. This involves a two-step process and requires in addition to the spray drying apparatus an expensive separate apparatus for the moistening step and careful manipulation of the latter to produce a satisfactory product.

It is the primary object of the present invention to provide a process in which the whey or other liquid containing milk sugar after concentration is reduced in a single operation by spray drying to a finely divided solid in which the milk sugar is substantially all in the form of the hydrate and the material, therefore, is substantially non-hygroscopic. Thus the intermediate conversion of the material to the anhydrous form and re-moistening thereof and also grinding of hard masses of crystallized material is avoided.

Further objects of the invention will appear from the following description in which the preferred embodiment of the invention has been set forth in detail in conjunction with the accompanying drawing.

In carrying out the present invention, the liquid material from which the final product is manufactured is first concentrated, and this concentrate is then spray-dried under such conditions as to directly produce a stabilized product. Stabilization of the milk sugar or lactose of the material occurs simultaneously with the desiccation of the material in the spray drier.

In practice, we proceed as follows:—Assuming that the material being treated is milk whey, formed as a by-product in the manufacture of cheese, or by the removal of casein from skim milk with rennet or by acidulation, the whey is passed through a suitable concentrating apparatus or evaporator. Before such treatment, it is often desirable to carry out a certain amount of neutralization whereby the hydrogen ion concentration is controlled to prevent inversion of the lactose. Where a mineral acid has been employed to precipitate the casein, partial neutralization of the remaining mineral acid serves to minimize corrosion of the equipment. Likewise, it is generally desirable to pasteurize the whey prior to neutralization, in order to prevent further formation of lactic acid. Such preliminary treatment may be practiced in accordance with the condition of the whey being employed and in accordance with the character of the product desired. The temperature or temperatures and the method of evaporation should preferably be such that the material is not seriously discolored, or otherwise affected to the detriment of palatability, odor, nutritive value, or general quality of the concentrate. Good results have been secured by continuing evaporation until the concentrate contains from 45 to 60% solids, or more.

Concentrate obtained as described above, particularly if it contains as much as 60% solids, is in a condition of super-saturation with respect to the milk sugar content. In other words, if permitted to stand for a considerable length of time, milk sugar would crystallize out. At lower concentrations, as for example in the neighborhood of 45% solids, there may not be a great amount of super-saturation, but the material may be said to be in the neighborhood of super-saturation. In our process any substantial amount of crystallization prior to spray drying is avoided by treating the material either as it comes from the evaporator or without allowing it to set for such a period as would produce crystallization.

In commercial operation the maximum concentration employed is limited by several factors, including the ability of the atomizer employed to properly subdivide and spray the somewhat viscous material, and the degree of concentration at which the material will remain supersaturated for a reasonable period of time to permit spraying it without crystallizing. The latter factor varies somewhat in accordance with the components of the whey, and its previous treatment. The minimum concentration which may be employed is limited to that at which a powdered product may be obtained in the spray drying operation.

The next step of this process is to spray-dry the concentrate under such conditions that a divided and powdered product is secured which is not anhydrous, but which has a water content sufficient to supply water of crystallization for the milk sugar content and in usual practice more or less excess water. In a typical instance the free moisture content of the spray dried material was about 12 to 14%, in addition to the water required for conversion of the milk sugar content, to the form of a monohydrate.

During this spray drying operation which is carried out by atomizing the concentrate and by contacting the atomized particles with a drying gas under proper controlled conditions, crystallization of milk sugar takes place at a rapid rate simultaneously with removal of moisture and in optimum operation is substantially completed in each particle before the latter settles out at the bottom of the tower. Under certain conditions of operation, some final crystal formation may occur in the material after the material has settled out of the gaseous medium of the spray-drying zone, but such crystal formation, if it occurs is not sufficient to cement together the divided particles to form hard caked masses.

Following the spray drying operation described above, the product will usually contain too much free moisture to be salable. Therefore it is subjected to a further drying operation, which can be carried out by known forms of equipment, and under such temperature conditions that part of the free moisture only will be removed and the water of crystallization permitted to remain. For example this final drying can be carried out by contacting the material with a drying gas at a temperature of about 140° F., and for a sufficient length of time to reduce the free moisture content to about 3%, without removing the water of crystallization. By careful control of temperature and other factors we have been able to produce in the spray drying operation a stable product with a free moisture content sufficiently low to enable omission of the final drying operation, but this requires more exact control of variables and in commercial operation it is ordinarily preferable to leave in the material more or less excess moisture and remove any objectionable excess by a subsequent drying operation.

The single figure of the drawing illustrates a suitable apparatus for carrying out the spray drying operation described above. This apparatus comprises a suitable chamber 10, which can be circular in transverse cross-section. One or more conduits 11 communicate with the chamber for introduction of hot air or like drying gas, while conduits 12 enable the withdrawal of exhaust of gases. Near the upper portion of chamber 10 and located substantially coincident with the chamber axis, there is a centrifugal atomizer 13, to which the liquid concentrate can be supplied. A baffle wall 14 is shown for directing the hot gases being introduced, into an annular stream surrounding the centrifugal atomizer 13. In place of a centrifugal atomizer, other atomizing devices can be employed, such as a high pressure pump delivering the material through an atomizing nozzle.

The optimum inflow and outflow temperatures of the drying gas will depend upon the solid contents and character of the concentrate, and can be readily determined by experiment. In general there is a substantial drying range within which the results desired may be obtained, and this range is wider for higher concentrations, and becomes more narrow as the concentration is reduced. For example at 40% solids the drying range is so narrow that spray drying to directly produce a stabilized and divided product is difficult if not impossible, while at higher concentrations the permissible range of operation is ample for continuous commercial production. An increase in the amount of moisture removal during the spray drying operation beyond the optimum drying range for the particular concentrate being treated, causes formation of material consisting of sticky lumps together with some properly stabilized powder. This appears to be due to the formation of small amounts of anhydrous material. When such material is permitted to stand for a short time however, the lumps slack out and readily crumble to form a divided stabilized material. An excessive reduction in moisture content in the spray drying operation causes formation of more anhydrous and hygroscopic material and if carried too far may cause caking in the product. A moderate decrease in the amount of drying below the optimum range causes the material to become somewhat tacky, so that when compressed in the hand, it tends to agglomerate. Such material however, when permitted to stand, slacks out to form a true stabilized and powdered material, without cementing together to form hard caked masses. Insufficiency in the moisture removal during spray drying increases the wetness and tacky character of the material, until the material is virtually in the form of a viscous concentrate which in standing sets up to form a paste.

To afford a better understanding of the control, the following specific data are cited by way of example. The apparatus used was substantially as shown in the drawing. With a whey concentrate consisting of 60% solids, we have secured good results with an inflow drying gas temperature of about 310° F., and an outflow gas temperature of about 130° F. Under such conditions of operation there was direct production of a stabilized powdered material containing from 12 to 14% free moisture, which, upon falling to the bottom of the drying chamber, had little if any tackiness, and felt comparatively dry to the touch. Upon lowering the outflow gas temperature to 125° F., (by decreasing the inflow temperature or by increasing the feed of material with maintenance of the inflow temperature) the material produced was still a satisfactory product but was slightly tacky. On standing for about five minutes such material slacked out to form a non-tacky and stabilized powdered product. With an outflow gas temperature of about 120° F., the product was tacky and wet enough to stick to the hands, although when left standing for about twenty minutes it slacked out and became a fairly satisfactory coarse powder. With an outflow gas temperature below 120° F. the material became a coarse concentrate, which when permitted to stand, crystallized to form a solid mass. With an outflow gas temperature of the order of 140° F. or slightly above, some sticky lumps of material formed, which however readily slacked out and crumbled to a powder. At 150° F. considerable anhydrous material was formed, resulting in sticky lumps in the products.

A whey concentrate consisting of 55% solids under similar conditions gave results substantially the same as the material containing 60% solids. Comparable results were secured with a 50% concentrate, at outflow temperatures about five degrees higher.

With a 45% concentrate, a fairly satisfactory product was obtained with an outflow temperature of from 140 to 145° F. At 140° F. there was a tendency for the material to be tacky as deposited in the tower, but within a short period, the material was satisfactory. At 135° F. outflow gas temperature the material was wet enough to stick to the hands, while at 150° F., a considerable amount of the material was anhydrous and lumpy.

With a 40% concentrate, and an outflow gas temperature of 145° F. the product was anhydrous and sticky. At 135° F., exit gas temperature the material was in the form of a wet whip which required to stand a period of about 15 minutes, before it could be crumbled to form a divided material.

With a 36.5% concentrate at an outflow temperature of 135° F., the product was a sticky mass. At 140° F. it was a wet whip, and at 145° F. it was anhydrous and lumpy.

In general an operator must take into account the character of whey being treated and its prior treatment and concentration, the size of the desiccating equipment and the temperature and volume of the heating gas employed and the amount of material being sprayed. For example, whey obtained by the use of hydrochloric acid appears to require a somewhat higher outflow gas temperature, than whey obtained from the manufacture of cheese or other methods. In the above tests, the concentrates employed were blends of wheys produced by the use of sulphuric and hydrochloric acids, and whey obtained from the manufacture of cheese.

It will be evident that with direct production of a stabilized and powdered material, such material can be removed through the lower discharge conduit 15, either intermittently or continuously. For this purpose suitable means, such as a gate 16, has been indicated. The apparatus can be operated with some accumulated settled material in the lower portion of the chamber 10, above the gate 16. Upon removal from chamber 10 the dried material can be supplied to the finishing drier 18, and after passing through this drier, it can be passed through a blower 19, which delivers it to a separator 20 of the cyclone or bag type. The drier 18 may be of the conventional tunnel type, a revolving drum drier through which a drying gas is passed, or a chamber in which the material is placed in suspension in a drying gas.

It has previously been explained that in the primary drying operation, conversion of milk sugar to the form of a monohydrate, and, crystallization of milk sugar or lactose, take place simultaneously with removal of moisture from the atomized particles. The rapid rate of crystal formation is attributed to the highly super-saturated condition of the milk sugar as moisture is removed from the atomized particles. Note in this connection that no substantial amount of crystals should be present in the concentrate before it is supplied to the centrifugal atomizer, since such crystals might cause clogging. Even if the concentrate is not super saturated with respect to milk sugar content when supplied to the centrifugal atomizer, a condition of supersaturation is attained as moisture is removed from the atomized particles. According to present observations crystal formation during the spray drying operation occurs at a rate commensurate with the rate of moisture removal. While the lactose may undergo some continued changes immediately following the spray drying operation, no prolonged time period of set is required, and the material maintains its discrete particle form. Tests have demonstrated that immediately after a spray drying operation, the settled, divided material in the lower portion of the chamber 10 may be non-hygroscopic and free flowing.

The product formed by our process is of high quality and is well suited for use as a stock feed, or as a food material for human consumption. It is not hygroscopic when exposed to the atmosphere, and need not be packed in steel containers or air tight cartons.

We claim:

1. In a method of manufacturing a substantially non-hygroscopic powdered product from a solution containing substantial amounts of lactose, spray drying the material to directly form a powdered product while retaining therein sufficient water to form with the lactose the hydrate thereof.

2. In a method of manufacturing a non-hygroscopic, powdered food product from a liquid material containing lactose in substantial amounts, forming from said material a concentrate, spraying the concentrate into a drying gas supplied and removed at such temperatures that the sprayed material is formed into solid particles while containing sufficient water to form the lactose into the hydrate.

3. In a method of manufacturing a non-hygroscopic powdered food product from whey or the like, concentrating the material to form a concentrate containing between 40 and 60% solids, spraying the concentrate into a drying gas supplied and removed at such temperatures that the material is formed into solid particles while containing sufficient water to convert the lactose thereof to the hydrate.

4. In a method of manufacturing a non-hygroscopic powdered food product from whey or the like, concentrating to produce a concentrate containing about 40% solids or higher, and spraying the concentrate in liquid condition into a drying gas supplied and removed at such temperatures that the sprayed material is formed into solid particles while containing sufficient water to convert the lactose thereof to the hydrate.

5. In a method of manufacturing a non-hygroscopic powdered food product from whey or the like, forming therefrom a concentrate and spraying the concentrate in liquid form into a drying gas supplied and removed at such temperatures and in such volume relative to the amount of material treated that the sprayed material is formed into solid particles while containing sufficient water to convert the lactose of the material to the hydrate.

6. In a method of manufacturing a non-hygroscopic powdered food product from a liquid material containing lactose in substantial amounts, forming therefrom a concentrate and spraying the concentrate in liquid condition into a drying gas supplied and removed at such temperatures that the sprayed material is formed into solid particles while containing sufficient water to convert the lactose of the material to the hydrate and suspending the material in the drying gas a sufficient period of time to permit the substantial conversion of the lactose thereof into the hydrate form.

7. In a method of manufacturing a non-hygroscopic powdered food material from whey or the like, forming a concentrate containing about 40% solids or more and spraying the concentrate in liquid condition into a drying gas supplied at a temperature above the boiling point of water whereby the sprayed material is converted into solid particles and removing such particles from the gas while they contain sufficient water to convert the lactose of the material to the hydrate.

8. In a method of manufacturing a non-hygroscopic powdered food product from whey or the like, concentrating the material until it contains about 50% solids or more, spraying the concentrate in liquid condition into a drying gas supplied at a temperature of about 310° F. and separating the gas from the dried material while the former is at a temperature upwards of 130° F.

9. In a method of manufacturing a non-hygroscopic powdered food product from whey or the like, concentrating the material until it contains about 40% solids or more, spraying the concentrate in liquid condition into a drying gas supplied at a temperature of about 310° F. and separating the gas from the dried material while the former is at a temperature between 130° F. and 150° F.

DAVID D. PEEBLES.
PAUL D. V. MANNING.